US010992565B2

(12) United States Patent
Chibba et al.

(10) Patent No.: US 10,992,565 B2
(45) Date of Patent: Apr. 27, 2021

(54) METHOD FOR SELECTIVELY EXTRACTING PROTOCOL MESSAGE CONTENT AS WELL AS NETWORK TEST SYSTEM

(71) Applicant: Rohde & Schwarz GmbH & Co. KG, Munich (DE)

(72) Inventors: Manish Chibba, Putzbrunn (DE); Samuele Tortelli, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 23 days.

(21) Appl. No.: 16/028,952

(22) Filed: Jul. 6, 2018

(65) Prior Publication Data

US 2020/0014612 A1 Jan. 9, 2020

(51) Int. Cl.

*H04L 12/26* (2006.01)
*H04L 12/24* (2006.01)
*H04L 29/06* (2006.01)

(52) U.S. Cl.

CPC .............. *H04L 43/50* (2013.01); *H04L 41/06* (2013.01); *H04L 41/145* (2013.01); *H04L 69/18* (2013.01); *H04L 69/22* (2013.01)

(58) Field of Classification Search

CPC ......... H04L 43/50; H04L 69/18; H04L 41/06; H04L 69/22; H04L 41/145

See application file for complete search history.

(56) References Cited

U.S. PATENT DOCUMENTS 9,264,923 B1 * 2/2016 Sevindik ................. H04L 43/50
10,019,532 B2 * 7/2018 Dufour .............. G06Q 30/0253
2001/0036224 A1 * 11/2001 Demello ................. H04L 63/30 375/220
2014/0006871 A1 * 1/2014 Lakshmanan ......... H04L 41/064 714/37
2015/0149834 A1 * 5/2015 Raddino ................. G06F 11/26 714/46
2018/0049052 A1 * 2/2018 Doshi ................... H04W 24/06
2018/0349254 A1 * 12/2018 Hui ...................... G06F 11/3692
2019/0081850 A1 * 3/2019 Nazar ................. H04L 41/0631

* cited by examiner

*Primary Examiner* — Shailendra Kumar

(74) *Attorney, Agent, or Firm* — Christensen O'Connor Johnson Kindness PLLC

(57) ABSTRACT

A method for selectively extracting protocol message content includes creating a template comprising a test scenario having at least one network event to be tested; assigning protocol message features related to the at least one network event to at least one predefined tag as part of the template during creation of the test scenario; providing a field log file including a plurality of measured protocol messages; identifying those protocol messages of the plurality of measured protocol messages of the field log file as relevant protocol messages that comprise features having a specific tag; and extracting from the relevant protocol messages parts of or the entire protocol message content. Further, a network test system is described.

20 Claims, 2 Drawing Sheets

20, 20.1, 26
20, 20.2, 26
20, 20.3
22 22 22 22 22 22 22 22 22 22 22
A B C D A E F D G H D
A C D A F D
22 22 22 22 22 22
28 28

METHOD FOR SELECTIVELY EXTRACTING PROTOCOL MESSAGE CONTENT AS WELL AS NETWORK TEST SYSTEM

FIELD OF THE DISCLOSURE

The disclosure relates to a method for selectively extracting protocol message content as well as a network test system.

BACKGROUND

During drive tests with devices under test, for example user equipment like a mobile phone, in wireless network environments like LTE/4G-, 5G-networks, protocol messages of the device under test and the network environment are recorded constantly by the device under test itself and stored as a field log file. Thus, the field log files of the device under test contain a lot of protocol messages, some of them being relevant for a specific network event, some of them not.

When analyzing the behavior of the device under test in specific situations, i.e. during specific network events, only the protocol control messages or parts of the protocol control messages that are actually relevant for the network event of interest have to be identified and their relevant protocol message content has to be extracted. The remaining content of the field log file may be irrelevant or even distracting so that it is desirable to focus only on the relevant protocol message content.

Thus, there is a need for selectively extracting protocol message content from a field log file.

SUMMARY

For this purpose, a method for selectively extracting protocol message content is provided, comprising the following steps:

a) creating a template comprising a test scenario having at least one network event to be tested;

b) assigning protocol message features related to the at least one network event to at least one predefined tag as part of the template during creation of the test scenario;

c) providing a field log file comprising a plurality of measured protocol messages;

d) identifying those protocol messages of the plurality of measured protocol messages of the field log file as relevant protocol messages that comprise features having a specific tag; and e) extracting from the relevant protocol messages parts of or the entire protocol message content.

In particular, at least the part of the protocol message containing the feature with the specific tag is extracted.

By assigning the features of interest to predefined tags, it is possible to effectively and automatically identify relevant protocol messages or parts of relevant protocol messages within the plurality of protocol messages of the field log file by using the tags for classification.

The entire contents or parts of the contents of the identified relevant protocol messages, i.e. the relevant protocol message content, may then be extracted selectively to obtain solely the relevant protocol message content that is of actual interest. The remaining contents are discarded, for example.

Preferably, those parts of the protocol message content of the relevant protocol messages are extracted that comprise features having the specific tag. This way, the amount of extracted content can be reduced further.

In order to limit the data acquisition to relevant content, protocol message content is extracted from relevant protocol messages only.

In an embodiment of the disclosure, the field log file is recoded using a device under test (DUT). The DUT may be a user equipment (UE). For example, the recording of the field log file may be performed in a real-life network environment, in particular while moving the DUT geographically.

For example, one of the at least one predefined tag is an "include"-tag, and protocol messages are identified as relevant protocol messages that comprise at least one feature having the "include"-tag for allowing a simple way of identifying relevant content.

Those parts of the protocol message content of a protocol message may be extracted that comprise at least one feature having the "include"-tag allowing automatic extraction of content.

In an aspect of the disclosure, one of the at least one predefined tag is an "undecided"-tag, and those parts of the protocol message content of a protocol message are extracted that comprise at least one feature having the "undecided"-tag, if the protocol message is a relevant protocol message. This way, not all of the relevant protocol messages or features have to be known beforehand.

The parts associated with the "undecided"-tag may be extracted in addition to parts comprising features having the specific tag, especially the "include"-tag.

In an another aspect of the disclosure, one of the at least one predefined tag is an "exclude"-tag, and those parts of the protocol message content of a protocol message are not extracted that comprise at least one feature having the "exclude"-tag. This allows to deliberately exclude features and/or control messages from extraction.

For analyzing more complex situations, the test scenario comprises more than one network event to be tested, wherein only those protocol messages of the plurality of measured protocol messages of the field log file are identified as relevant protocol messages that comprise at least one feature having the specific tag and that are related to at least two network events to be tested.

In order to reduce configuration efforts, the test scenario comprises more than one network event to be tested, the more than one network event may be variations of a single network event to be tested and/or more than one distinct network event to be tested.

In another aspect of the disclosure, at least one simulation event is created comprising the extracted protocol message content allowing for precise simulations and/or emulations of the network event to be tested.

The simulation event may then be used to simulate the network event to be tested using a network simulator or network emulator.

In another embodiment of the disclosure, a network profile is derived comprising at the least one simulation event allowing a more versatile and complete simulation and/or emulation.

For precise lab tests, a network environment may be created based on the network profile and/or the at least one simulation event.

The network environment may be created using a network simulator. Thus, the method shown in this disclosure may also be regarded a method for creating a network environment.

For example, the template and the field log file are provided to a protocol message retrieving module configured to identify the relevant protocol messages and to extract the protocol message content. In other words, the protocol message retrieving module may be configured to perform steps d) and e). This way, extraction may be performed by a single module.

For above purpose, a network test system is further provided, comprising a protocol message retrieving module configured to:

a) receive a template comprising a test scenario having at least one network event to be tested and assignments of protocol message features related to the at least one network event to at least one predefined tag;
b) receive a field log file comprising a plurality of measured protocol messages;
c) identify those protocol messages of the plurality of measured protocol messages of the field log file as relevant protocol messages that comprise features having a specific tag; and
d) extract from the relevant protocol messages parts of or the entire protocol messages content.

The protocol message retrieving module may be a software module or a hardware module.

For example, the network test system comprises a template module configured to:

a) create a template comprising a test scenario having at least one network event to be tested;
b) assign protocol message features related to the at least one network event to at least one predefined tag as part of the template during creation of the test scenario; and
c) transmit the template to the protocol message retrieving module.

In another aspect of the disclosure, the network test system comprises a network emulation module configured to create a network environment at least partially based on the extracted protocol message content. Thus, a network environment may be generated with little effort on a single system based on a field log file.

Needless to say, the features disclosed in context of the method are also features of the system and vice versa.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
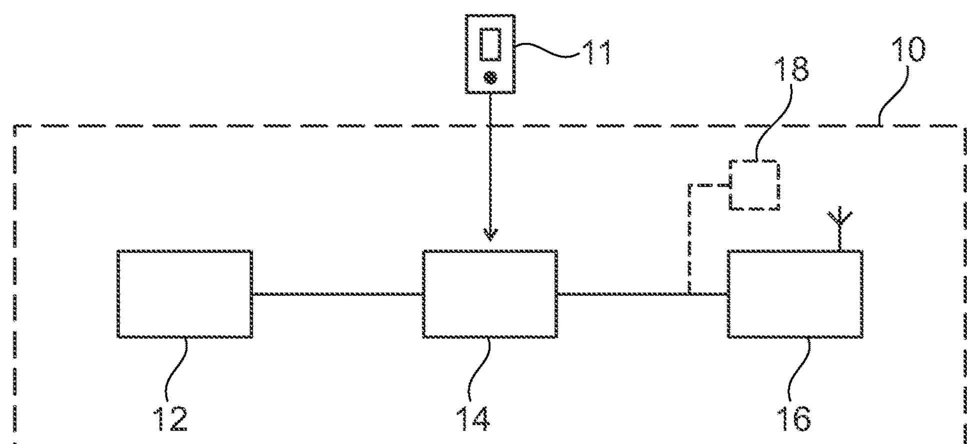
FIG. 1 shows a network test system according to an aspect of the disclosure.

FIG. 1 shows schematically a network test system 10 and a device under test 11 (DUT).

The DUT 11 may be a user equipment, like a mobile phone, smartphone, laptop or the like, as well as a base station or any other terminal equipment. The DUT 11 may also be a wireless network analysis device.

The DUT 11 comprises a field log file comprising protocol messages that have been recorded by the DUT 11 during tests, like a test drive, in a real-life network environment.

For example, to record the field log file, the device under test 11 has been moved geographically while recording.

The network test system 10 comprises a template module 12, a protocol message retrieving module 14 and a network emulation module 16.

In addition or alternatively to the network emulation module 16, the network test system 10 may comprise a network simulation module 18.

The modules 12, 14, 16 and 18 may be realized as hardware and/or software modules.

The network test system 10 may be a single machine including the modules 12, 14, 16 and/or 18.

Figure 2A:
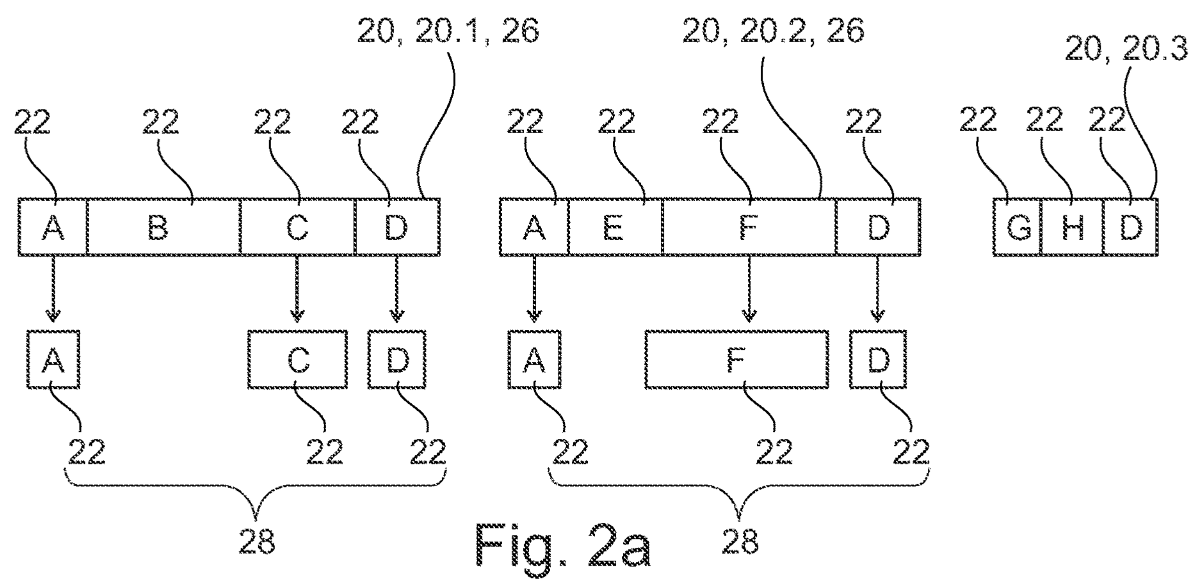
FIGS. 2*a* and 2*b* show schematically an illustration of protocol messages and tags used during a method according to the aspect of the disclosure.

The network test system 10 is configured to selectively extract protocol message content from protocol messages 20, illustrated in FIG. 2*a*.

Protocol messages 20 may be protocol messages of a wireless communication protocol like 4G/LTE, 5G, GSM or the like.

The protocol messages 20 contain various features 22 with different functions.

For example, a protocol message 20 may be a RRC connection reconfiguration message, which could be broken down in the features 22 “handover”, “carrier aggregation”, “DRX”, or the like.

In FIG. 2*a*, three different protocol messages 20.1, 20.2 and 20.3 are shown, each containing different features 22, indicated with upper-case letters.

The first protocol message 20.1 comprises the features A, B, C, D, the second protocol message 20.2 comprises the features A, E, F, D, and the third protocol message 20.3 comprises features G, H and D.

One or more of the protocol messages 20 or features 22 of the protocol messages 20 may relate to a network event like beam switch, LTE registration, or the like.

The network event can also be any other 3GPP procedure or block for configuring a test system, like a Rhode & Schwarz CMW-500. In certain applications, a network event may also refer to as a “card” (CMWcard).

In the same way, the single features 22 of the protocol messages 20 may relate to one or more of the network events.

Figure 3:
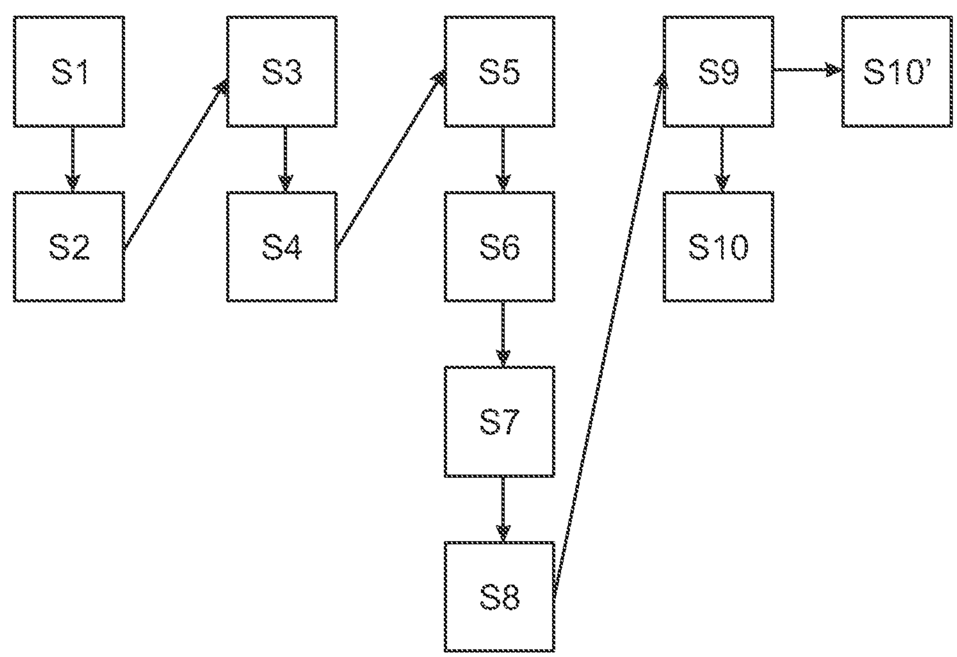
FIG. 3 shows workflow of the method according to the aspect of the disclosure.

In order to efficiently analyze the field log file of the DUT 11, the network test system 10 is configured and used to perform the method shown in FIG. 3.

In a first step S1, a template is created using the template module 12.

The template comprises a test scenario having at least one network event to be tested. The test scenario may be a 3GPP conform test.

The test scenario includes the network event to be tested. In this example, the test scenario is a beam switch with subsequent registering of LTE. In this case, the scenario may include the network event of a beam switch and the network event of registering LTE.

It is also possible that the template comprises a variation of the at least one network event of the test scenario, i.e. network events that are very similar or have the same effect than the network event of the test scenario that shall be tested.

These variations may be added automatically by the template module 12.

In the next step S2, protocol message features 22 are assigned to different tags, using the template module 12 as well. Both of steps S1 and S2 may be performed by a user using the template module 12. Thus, the template module 12 is configured to perform the steps S1 and S2.

In the shown embodiment, three predefined tags are used: Tag 1 being an "include"-tag, Tag 2 being an "exclude"-tag and Tag 3 being an "undecided"-tag.

Figure 2B:
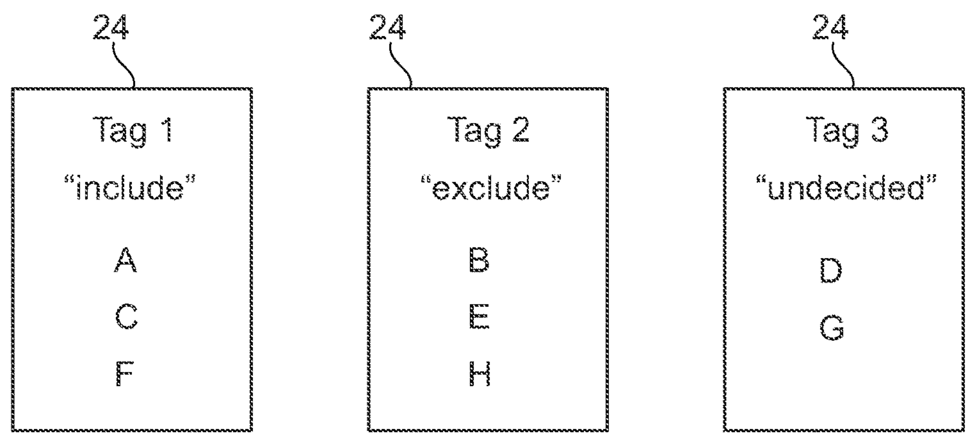

As can be seen in FIG. 2*b*, the features 22 are assigned to the tags 24 according to their relevance for the analysis of the field log file that should be performed.

In the shown embodiment, the features A, C and F are regarded as important so that they shall be extracted. Thus, they are assigned to the "include"-tag (Tag 1).

In contrast, the features 22 assigned to the "exclude"-tag (Tag 2) are not regarded as relevant for the analysis so that they shall not be extracted from the field log file. In the shown embodiment, these features 22 are features B, E and H.

Features 22 assigned to the "undecided"-tag (Tag 3) are features 22 whose relevance is not yet known but might be relevant if present in the same protocol message 20 as a relevant feature 22. In the shown embodiment, the features 22 assigned to Tag 3 are features D and G.

The assignment of the features 22 to the tags 24 is saved and becomes part of the template. It is not necessary to assign all possible features 22 to tags 24. Unassigned features 22 are simply ignored during the evaluation.

In the third step S3, the template is transmitted from the template module 12 to the protocol message retrieving module 14.

In another step S4 (which could have already been performed earlier), the field log file of the device under test 11 is transmitted and provided to the protocol message retrieving module 14.

The protocol message retrieving module 14 is configured to identify and extract only relevant protocol message content from the protocol messages 20 comprised in the field log file.

To achieve that, the protocol message retrieving module 14 identifies protocol messages 20 as relevant protocol messages 26 (step S5).

This is done by comparing the features 22 of the protocol messages 20 of the field log file with the features 22 assigned to the tags 24 of the template.

Protocol messages 20 are identified as relevant protocol messages 26, if the protocol message 20 comprises at least one feature 22 that has a specific tag 24, which would be the "include"-tag (Tag 1) in the shown embodiment.

As seen in FIG. 2*a*, the first protocol message 20.1 and the second protocol message 20.2 both comprise features 22 that are assigned to the "include"-tag, namely features A, and C for the first protocol message 20.1 and features A and F for the second protocol message 20.2.

The third protocol message 20.3 does not comprise any features 22 that are assigned to the "include"-tag. The third protocol message 20.3 is therefore not a relevant protocol message 26.

Thus, only the first protocol message 20.1 and the second protocol message 20.2 are identified as relevant protocol messages 26.

In the next step S6, the protocol message content is extracted from the relevant protocol messages 26. However, only those parts of the protocol message content of a relevant protocol message 26 are extracted that comprise a feature 22 assigned to the "include"-tag or assigned to the "undecided"-tag.

In the shown embodiment, the protocol message content of the features A, C and D of the first protocol message 20.1 and the protocol message content of the features A, F and D of the second protocol message 20.2 are extracted being the extracted protocol message content 28. As feature D is assigned to the "undecided"-tag, its protocol message contents are also extracted from the first and second protocol message 20.1, 20.2 because it is part of a relevant protocol message 26.

In contrast, even though the third protocol message 20.3 also comprises feature D, no protocol message content is extracted from the third protocol message 20.3 because the third protocol message 20.3 has not been identified as a relevant protocol message 26.

The protocol message content of features B and E of the relevant protocol messages 26 are not extracted, because the features B and E have been assigned to the "exclude"-tag in the template.

Further, it is possible that only those protocol messages 20 of the field log file are identified as relevant protocol messages that are related to two or all of the network events included in the template. In the shown embodiment, for example the first and the second protocol messages 20.1, 20.2 both relate to the network events of beam switching and LTE registering, thus their contents are extracted.

In a seventh step S7, the extracted protocol message content 28 may be used to create one or more simulation events.

A simulation event comprises all information, like protocol message content, necessary to effectively simulate or emulate a network event of a real-life network environment.

With the simulation event, a network profile of a network environment may be derived in the next step (step S8). The network profile may be used to simulate or emulate a network environment in which the simulation event takes place.

In step S9, the simulation event, the network profile and/or the extracted protocol message content 28 is transmitted to the network emulation module 16 and/or the network simulation module 18.

Of course, it is also possible that the network emulation module 16 and/or the network simulation module 18 create the simulation event or the network or derive the network profile.

The network emulation module 16 is configured to create a real-life network environment based on the simulation event and/or the network profile (step S10).

The created real-life network environment resembles the real-life network environment that the DUT 11 had been part of during the recording of the field log file. Further, the emulated network environment may also comprise the network events to be tested.

In addition or in the alternative, the network simulator module 18 may simulate a network environment based on the simulation event or the network profile (step S10'). The simulated network environment may be the same as the emulated network environment by the network emulation module 16.

In summary, with the network test system 10 and the shown method, protocol message content can be extracted selectively from a field log file and a network environment can be emulated based on the extracted protocol message content effectively.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for selectively extracting protocol message content, comprising:

creating a template comprising a test scenario having at least one network event to be tested;

assigning protocol message features related to said at least one network event to at least one predefined tag as part of said template during creation of said test scenario;

providing a field log file comprising a plurality of measured protocol messages;

identifying those protocol messages of said plurality of measured protocol messages of said field log file as relevant protocol messages that comprise features having a specific tag; and automatically extracting from said relevant protocol messages parts of or said entire protocol message content, wherein parts of said protocol message content of said relevant protocol messages are extracted that comprise features having said specific tag, wherein the field log file is recorded in a real-life network environment and the field log file contains a multitude of protocol messages, only some of said multitude of protocol messages being relevant for said at least one network event, the remaining content of the field log file being irrelevant for subsequent processing.

2. The method according to claim 1, wherein protocol message content is extracted from relevant protocol messages only.

3. The method according to claim 1, wherein said field log file is recoded using a DUT.

4. The method according to claim 1, wherein one of said at least one predefined tag is an “include”-tag, and wherein protocol messages are identified as relevant protocol messages that comprise at least one feature having said “include”-tag.

5. The method according to claim 4, wherein those parts of said protocol message content of a protocol message are extracted that comprise at least one feature having said “include”-tag.

6. The method according to claim 1, wherein one of said at least one predefined tag is an “undecided”-tag, and wherein those parts of said protocol message content of a protocol message are extracted that comprise at least one feature having said “undecided”-tag, if said protocol message is a relevant protocol message.

7. The method according to claim 1, wherein one of said at least one predefined tag is an “exclude”-tag, and wherein those parts of said protocol message content of a protocol message are not extracted that comprise at least one feature having said “exclude”-tag.

8. The method according to claim 1, wherein said test scenario comprises more than one network event to be tested, wherein said more than one network event may be at least one of variations of a single network event to be tested and more than one distinct network event to be tested.

9. The method according to claim 1, wherein at least one simulation event is created comprising said extracted protocol message content.

10. The method according to claim 9, wherein a network profile is derived comprising said at least one simulation event.

11. The method according to claim 9, wherein a network environment is created using at least one of said network profile and said at least one simulation event.

12. The method according to claim 1, wherein said template and said field log file are provided to a protocol message retrieving module configured to identify said relevant protocol messages and to extract said protocol message content.

13. The method according to claim 1, wherein the protocol messages are from a wireless communication protocol.

14. The method according to claim 1, wherein the field log file is recorded by moving the device under test geographically.

15. A network test system comprising:

a protocol message retrieving circuit configured to:

receive a template comprising a test scenario having at least one network event to be tested and assignments of protocol message features related to said at least one network event to at least one predefined tag;

receive a field log file comprising a plurality of measured protocol messages;

identify those protocol messages of said plurality of measured protocol messages of said field log file as relevant protocol messages that comprise features having a specific tag; and extract from said relevant protocol messages parts of or the entire protocol messages content, wherein parts of said protocol message content of said relevant protocol messages are automatically extracted that comprise features having said specific tag, wherein the field log file is recorded in a real-life network environment and the field log file contains a multitude of protocol messages, only some of said multitude of protocol messages being relevant for said at least one network event, the remaining content of the field log file being irrelevant for subsequent processing.

16. The network test system according to claim 15, further comprising a template circuit configured to:

create a template comprising a test scenario having at least one network event to be tested;

assign protocol message features related to said at least one network event to at least one predefined tag as part of said template during creation of said test scenario; and transmit said template to said protocol message retrieving circuit.

17. The network test system according to claim 15, further comprising a network emulation circuit configured to create a network environment at least partially based on said extracted protocol message content.

18. The network test system according to claim 15, wherein the field log file is recorded by moving the device under test geographically.

19. A network test system comprising:

a protocol message retrieving circuit configured to:

receive a template comprising a test scenario having more than one network event to be tested and assignments of protocol message features related to said more than one network event to at least one predefined tag;

receive a field log file comprising a plurality of measured protocol messages, wherein the field log file is recorded in a real-life network environment;

identify those protocol messages of said plurality of measured protocol messages of said field log file as relevant protocol messages that comprise features having a specific tag, wherein only those protocol messages of said plurality of measured protocol messages of said field log file are identified as relevant protocol messages that comprise at least one feature having said specific tag and that are related to at least two network events to be tested; and extract from said relevant protocol messages parts of or the entire protocol messages content.

20. The method according to claim 19, wherein the field log file is recorded by moving the device under test geographically.

* * * * *